Figure 1:
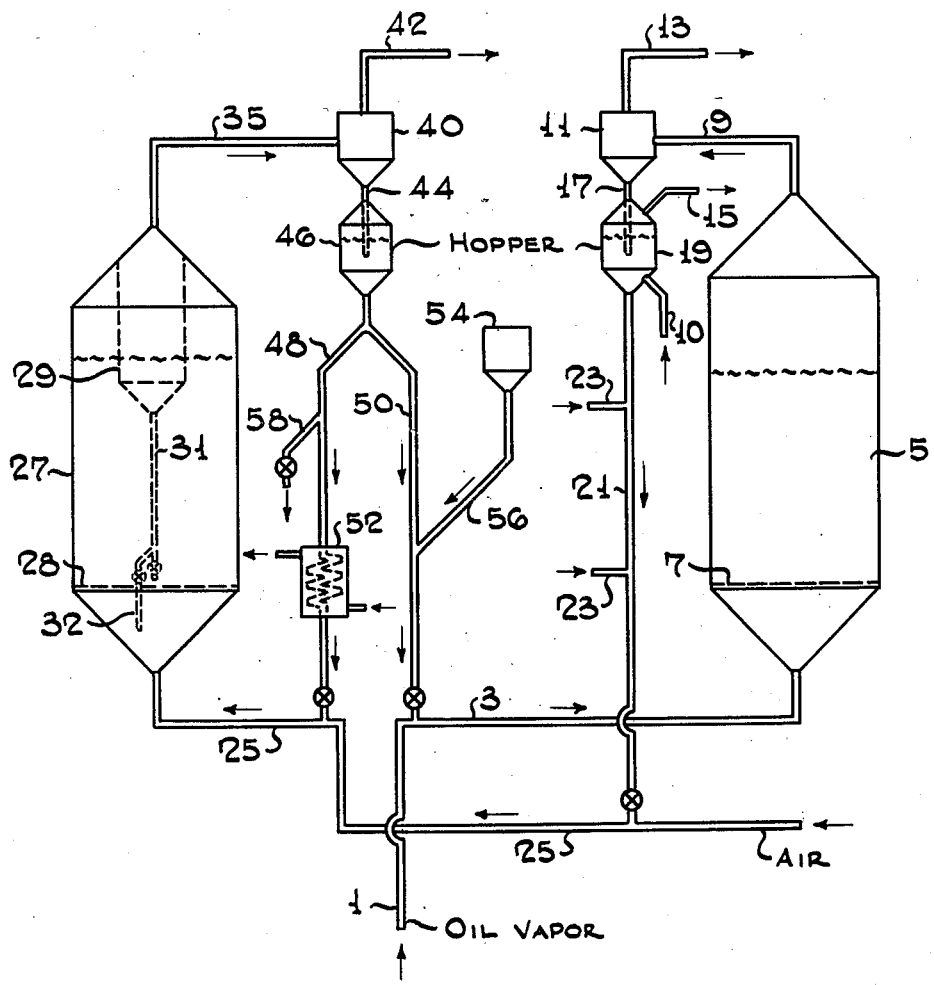

Walter A. Wurth
Homer Z. Martin  Inventors
Charles E. Jahnig
By P. J. Whelan Attorney

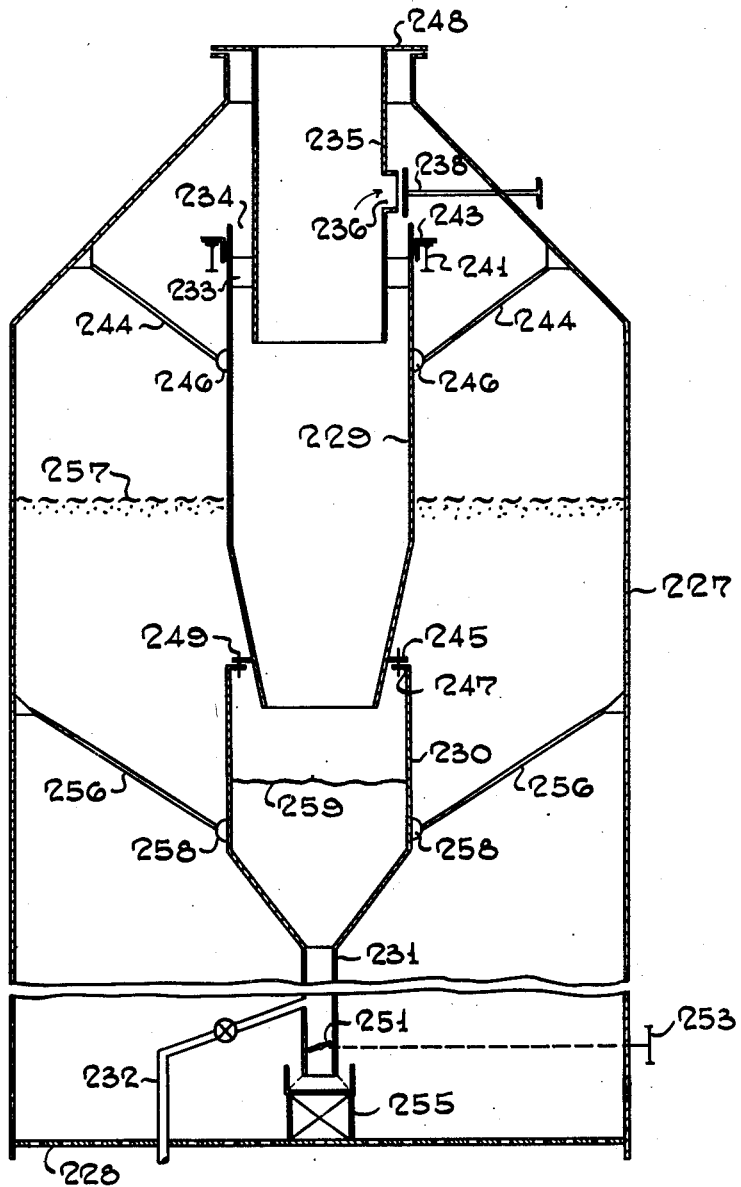

Patented Nov. 25, 1952

2,619,473

UNITED STATES PATENT OFFICE 2,619,473

METHOD AND APPARATUS FOR REGENERATING A FLUIDIZED CATALYST

Walter A. Wurth, Cranford, and Homer Z. Martin and Charles E. Jahnig, Roselle, N. J., assignors to Standard Oil Development Company, a corporation of Delaware Application May 14, 1946, Serial No. 669,510

2 Claims. (Cl. 252—417)

The present invention relates to improvements in the art of contacting solids and gases and pertains more particularly to a process and apparatus in which solid material in finely divided form is fluidized in a gaseous or vaporous medium and the resulting fluidized mass is subjected to a treatment for the purpose of causing physical and/or chemical changes in the gases and/or solids.

The invention in its more specific phases is directed to processes in which the fluidized solid material after passing through a treating zone is separated from the gases or vapors and returned to the treating zone. In particular, it has application to processes in which it is desirable to reactivate or regenerate catalyst powders before returning the same to the treating zone, as in the catalytic conversion of hydrocarbon oils or vapors. For illustrative purposes the invention will be described with specific reference to the catalytic cracking of petroleum oils, though it should be understood that the invention may find a more general application, particularly to other hydrocarbon conversions such as hydrogenation, dehydrogenation, polymerization, alkylation, isomerization, aromatization, desulfurization, also the synthesis of hydrocarbons from carbon monoxide and hydrogen, as well as certain non-catalytic processes wherein gases are acted upon by solids.

The application of the so-called fluid solids technique to catalytic conversions of hydrocarbons is well known in the art. For example, continuous catalytic cracking operations employing finely divided fluidized catalyst have been developed in recent years, wherein the powdered catalyst fluidized by the reaction gases and vapors is passed upwardly through a cracking zone, thereafter separated from the gases, fluidized with regenerating gases, passed upwardly through a regeneration zone, separated from the regeneration gases and returned to the cracking zone. Normally, the flow conditions of solids and gases are so controlled that there is a considerable slippage between the solid particles and the vapors in the conversion and regeneration zones so that continuous intermixing of the gases and solids is attained, the time of residence of the catalyst particles within the treating zones is considerably greater than that of the oil vapors, and a relatively dense suspension is formed in the treating zones. The velocity of the gases and vapors, however, is greater than the average rate of settling so that the gases may be used to carry the catalyst throuhg the treating zones.

In order to attain sufficient catalyst contact times in regeneration zones of practically feasible and economical size at the high superficial gas velocities required to carry the catalyst through the regeneration zones and in order to maintain a dense phase of the desired height and solids content it has been generally necessary to recycle large proportions of catalyst from the outlet to the inlet of the regenerator. For this purpose the total solids withdrawn from the regeneration zone must be separated from spent regeneration gas prior to their return to the regenerator inlet to avoid increasing dilution of the fresh regeneration gas with inert spent regeneration gas. In addition, separated powdered solids may be used in so-called standpipes, i. e., vertical fluidized solids columns of suitable height to establish the pressure required for the return of the solids to the regeneration or conversion zone. The high superficial velocity and high density of the solids-in-gas suspension to be separated by conventional mechanical separators, such as cyclones or the like, located outside the regeneration zone result in a strong erosion effect and consequent cyclone difficulties interfering with the continuity of the operations. The present invention overcomes these difficulties and affords various additional advantages, as will appear from the following description thereof read with reference to the accompanying drawing which shows semidiagrammatic views of apparatus adapted to carry out preferred embodiments of the invention.

It is therefore the principal object of our invention to provide an improved method and apparatus for contacting solids with gases by carrying a suspension of finely divided solids in a gaseous stream through a treating zone in a continuous manner.

Another object of our invention is to provide an improved method and apparatus of the type indicated which permit extended contact times of the solids in the treating zone while practically eliminating the difficulties heretofore encountered.

A further object of our invention is to provide an improved method and apparatus of the type indicated which permits the maintenance within a treating zone of a dense phase of a desired height and solids content without the difficulties heretofore encountered.

Other more specific objects and advantages will be apparent from the more detailed description hereinafter.

We have found that these objects and advantages may be accomplished by providing for an internal recycle of solids within the treating zone from a point above the dense solids phase to the bottom portion of the dense solids phase, while withdrawing from the treating zone solids which have been resident therein for a time sufficient to accomplish the desired reaction. In this manner we may avoid wholly or in part the conventional external recycle system and replace or supplement the high efficiency external cyclone separators of the conventional recycle by one or more internal separators of relatively low efficiency which due to their lower gas velocities or smoother directional changes are much less subject to erosion by circulating solids. An additional advantage of this arrangement results in the case of pressure operation because our internal separation system need not be in itself pressure resisting. The solids-in-gas suspension finally withdrawn from the treating zone is of relatively low density and may be separated in conventional high efficiency separators without undue erosion effects.

For a fuller understanding of the invention reference will now be made to the accompanying drawing wherein Fig. 1 is a diagrammatic view of an apparatus adapted to carry out the present invention, and Fig. 2 is an enlarged diagrammatic view of a treating zone of the type of zone 27 of Fig. 1, showing a preferred embodiment of our invention in greater detail.

While we will make specific reference to the regeneration of cracking catalysts in connection with the drawing, it should be understood that the system illustrated is applicable to numerous other reactions involving similar conditions of gas-solids contact.

Referring now to Fig. 1, oil to be cracked is supplied in the vapor state through line 1 and passed through line 3 wherein the vapors are mixed with highly heated powdered solid catalyst introduced into line 3 as will appear hereinafter.

The catalyst may be any active cracking catalyst such as natural or activated clays, synthetic gels, such as silica-alumina, silica-magnesia gels, or the like having a particle size of preferably less than 100 mesh. The amount of catalyst introduced into the oil may vary between about 0.5 and 20, preferably between about 2 and 12, parts by weight of catalyst per part by weight of oil.

The dispersion of powdered catalyst in oil vapors heated by the hot catalyst to cracking temperature which may fall within the approximate limits of 800° and 1000° F. is passed to the bottom of cracking vessel 5. The lower portion of chamber 5 may be provided with a perforated plate 7 to distribute the dispersion uniformly over the entire cross section of the cracking vessel. The cracking vessel is preferably made of such dimensions that the desired conversion is obtained at relatively low velocities, such as from .5 to 10 feet per second, preferably 1–5 feet per second. Because of the relatively low velocities at which the gases flow through the circuit, the powder tends to settle out of the gas. As a result there is a considerable slippage between the solid particles and the vapors so that continuous intermixing of the gas and solids is attained. Furthermore the density of the suspension or dispersion within the reaction zone will be materially greater than the density of the stream passing to the reaction zone or the relative proportions of catalyst and oil vapor introduced into the zone. The density of the mixture within the zone should be at least twice that of the stream passing thereto. The time of residence of the catalyst particles within the cracking zone is materially greater than the time of residence of the oil vapors. For example, whereas the time of residence of the oil vapors may be of the order of from 2 to 50 seconds, the time of residence of the solid particles within the cracking zone may be of the order of from 10 seconds to an hour or more. The velocity of the oil vapors passing through the cracking zone, however, is preferably sufficient to prevent complete settling of the powder so that the cracked vapors may be utilized for removing the powdered material from the cracking zone.

The suspension of oil vapors and catalyst is removed from chamber 5 through line 9 and passed to a conventional gas-solids separation system, consisting of one or more units, schematically indicated at 11 which may be of the centrifugal and/or electrical type. Oil vapors containing a small amount of residual catalyst powder are withdrawn through line 13 for further treatment. Catalyst separated from oil vapors and steam discharges through line 17 into catalyst hopper 19 provided with a conventional steam stripping and separation zone to strip off any oil vapors adhering to the separated catalyst. Steam is supplied through line 10 and stripped vapors and steam are withdrawn from the system through line 15 for any further treatment or use desired.

Catalyst from hopper 19 flows into a vertical standpipe 21 of sufficient height to feed the catalyst into a stream of regenerating gas under a pressure at least sufficient to overcome the pressure drop through the regenerating circuit. In order to facilitate the flow of catalyst through standpipe 21 the latter is aerated by the introduction of a small amount of a fluidizing gas through lines 23, which may be regenerating gas or an inert gas such as steam, carbon dioxide, flue gas, nitrogen or the like. From standpipe 21 the spent catalyst is passed into line 25 wherein it is suspended in a stream of regenerating gas such as air and/or oxygen, if desired, diluted with an inert gas such as steam, carbon dioxide, nitrogen or the like. The regenerating gas is placed under sufficient pressure for forcing the suspension of catalyst and gas through the regenerating circuit.

The suspension formed in pipe 25 is passed to the bottom portion of regenerating chamber 27 which may have a construction similar to that of cracking vessel 5. The dimensions of regenerating chamber 27 are such that the flow of suspension through the chamber is relatively slow so that considerable slippage occurs between the solids and the gases. The velocity of the gases, however, is greater than the average rate of settling so that the gases may carry the catalyst through the regenerating system with the result that the resident time of the catalyst in the regeneration zone is materially greater than that of the gas. The catalyst is subjected in regeneration chamber 27 to a combustion reaction to remove carbonaceous deposits formed thereon during the cracking operation.

The removal of carbonaceous deposits to the desired extent often requires a materially longer time of contact with the oxidizing gas than may be afforded by technically feasible and economical vessel dimensions at the prevailing flow conditions. In order to allow for the necessary contact time chamber 27 is provided with an internal gas-solids separator 29, preferably a cyclone separator, through which the gas-solids suspension is passed prior to its withdrawal from chamber 27. Separator 29 is so constructed and operated that a sufficiently large proportion of catalyst is separated and returned through pipe 31 to the bottom of chamber 27, preferably at a point just above distribution plate 28, to establish the desired contact time of the catalyst with the regenerating gas. When returning the separated solids to a point above grid 28, considerable mixing and distribution of said solids over the cross section of the vessel will be realized due to the turbulence. However, the distribution may be still further improved in many cases when returning solids from pipe 31 to a point below grid 28, as indicated at 32. A cyclone separator having a separating efficiency of not more than about 50% to 80% is generally sufficient for this purpose. Construction and operation of a preferred modification of this internal separation system will be described in more detail in connection with Fig. 2 of the drawing.

A suspension of regenerated catalyst in spent regenerating gas, of relatively low density, is withdrawn overhead from separator 29 and passed through line 35 to a gas solids separation system 40 which may be similar in construction to separation system 11 and which may be provided with a steam stripping and separation zone in a manner known per se. Spent regeneration gas and steam may be withdrawn through line 42 while separated regenerated catalyst passes downwardly through pipe 44 into hopper 46 at a point below the level of the material therein.

The regenerated catalyst collected in hopper 46 discharges continuously into two standpipes 48 and 50 feeding into lines 25 and 3, respectively. The pseudo-hydrostatic pressure at the bottom of standpipe 48 should be sufficient to return catalyst through line 25 to regeneration zone 27. A heat exchanger 52 is provided on standpipe 48 to add or withdraw heat to or from the catalyst to be recycled to regeneration zone 27 and only so much catalyst needs to be recycled through standpipe 48 as is required to maintain the temperature of the regeneration zone at a desired level.

The catalyst maintained in standpipe 50 is passed to oil feed line 3 substantially at the temperature of regeneration zone 27, suspended in the oil vapors and fed to cracking zone 5 in the manner and proportions indicated above.

Fresh make-up catalyst may be supplied to the system from catalyst hopper 54 through line 56. Used catalyst may be withdrawn through line 58 or at any other suitable point of the system.

The reason for including the catalyst recycle equipment in the regeneration circuit is the desirability of increasing catalyst holdup in the regeneration vessel, that is, the weight of catalyst held in suspension in the rising gas stream within the vessel. Thus, without recycle of catalyst, the average catalyst density (pounds of catalyst held within the vessel divided by total volume of the vessel in cu. ft.) may be as low as 5 lbs./cu. ft. or less, whereas by recycling catalyst the density may be maintained at 10 to 20 lbs. or more per cu. ft. Our internal recycle may also be readily so controlled that the external recycle through standpipe 48 may be completely dispensed with.

By virtue of this internal arrangement several advantages are obtained as compared to prior art, external recycle systems, which include:

(1) The erosion of the cyclones located externally and subsequent to the internal cyclone is greatly reduced due to the decreased catalyst concentration in the gas stream leaving the vessel.

(2) The external piping needed in prior art systems is avoided or substantially reduced.

(3) No or substantially less air is needed to recycle the catalyst to the regenerator.

(4) Heat loss from the regeneration system is reduced.

With respect to the operation and design of standpipe 48 and 50 it may be stated that in general a height of about 2-8 feet of fluidized catalyst are required for each pound of pressure desired at the base of the standpipes.

Referring now to Fig. 2, we have shown therein a preferred modification of a treating chamber of the type of regeneration zone 27 in greater detail. The chamber as illustrated essentially consists of an outer, preferably pressure-resistant shell 227, provided with a lower distribution grid 228, an internal cyclone separator 229 feeding into a solids hopper 230, a solids return pipe 231 with alternate solids return pipe 232 and an upper suspension discharge pipe 235 originating in the top section of cyclone separator 229 and having a smaller cross section than cyclone separator 229. A set of vane blades 233 is arranged within the ring space 234 formed by the walls of cyclone separator 229 and discharge pipe 235. Vane blades 233 may be permanently or removably fastened to the walls of cyclone separator 229 and/or discharge pipe 235 by welding, riveting, bolting, or similar means so that these three elements form an integral piece of equipment which may be supported within chamber 227 by girders 241 cooperating with flanges 243 attached to the outer wall of cyclone separator 229. In place of or in addition to girders 241 and flanges 243 supports 244 cooperating with hangers 246 may be arranged to support cyclone separator 229 from the wall 227 of the treating chamber. Discharge pipe 235 may also clear the vane blades 233 and find its support in flanges 248 resting on shell 227 as indicated, or other conventional supporting means may be provided to support discharge pipe 235 independently of cyclone separator 229. The lower portion of cyclone separator 229 has a tapering cross-section and leads into the upper portion of hopper 230 to which it may be attached by means of flanges 245 and 247 and bolts 249 or by welding or any other suitable removable or permanent fastening means. The conical lower portion of hopper 230 feeds into solids return pipe 231 which is preferably permanently attached to hopper 230 and provided with an adjustable damper 251 controlled by a damper control 253 arranged outside the shell 227. Pipe 231 extends downwardly to a point just above distribution grid 228. Stabilizing supports 255 attached to grid 228 cooperate with pipe 231 to prevent a substantial lateral movement of the entire separator system. Supports 256 cooperating with hangers 258 may replace or supplement stabilizer means 255 further to support and stabilize the unit within shell 227.

One or more orifices 236 may be provided in discharge pipe 235 to permit the solids in gas suspension to bypass the internal cyclone system 229 and 230. The opening of orifice 236 may be adjusted by control valve 238. In this manner the carry-over of solids from chamber 227 may be controlled within desired ranges.

In operation, a solids-in-gas suspension which may have a solids concentration of about $\frac{1}{10}$ to 5 lbs. per cu. ft. enters shell 227 through grid 228 at a superficial gas velocity in shell 227 of about 2-10 ft. per second, preferably about 1-5 ft. per second in the regenerator proper. As a result of settling and recycle of solids from cyclone 229 a dense solids phase having a solids concentration of about 10–30 lbs. per cu. ft. or more is formed within shell 227 to the approximate height indicated by level 257. Above level 257 the solids concentration of the suspension drops to about 1/10 to 5 lbs. per cu. ft. This relatively dilute suspension passes into the ring space 234 at a superficial gas velocity of less than about 100 ft. per second, preferably in the neighborhood of or less than about 50 ft. per second which is stepped up in narrow ring space 234 to as much as about 150 ft. per second, preferably in the neighborhood of or below about 90 ft. per second. A substantial proportion of the solids is separated under the effect of the centrifugal force resulting from the rotating motion of the gases caused by a suitable spiral or inclined arrangement of vane blades 233 in the usual manner of operation of such equipment. The separated solids drop down into hopper 230 and return pipe 231 and/or 232 which may be permitted to be filled with solids up to the approximate level 259. From hopper 230 the solids return to the main chamber within shell 227 through pipe 231 and/or 232 under the pressure of the solids column formed therein and controlled by damper 251. A suspension having a solids concentration of about 1/50 to 1/2 lbs. per cu. ft. (measured at a point upstream of the by-pass valves) is withdrawn through pipe 235 at a maximum gas velocity of approximately 150 ft. per second, preferably in the neighborhood of below 100 ft. per second.

It will be understood that operation and design of the system illustrated by Fig. 2 is so flexible that any practical internal solids recycle ratio and dense phase level and average solids density within chamber 227 required may be maintained to provide for any desired gas solids contact time. In the operation of our internal cyclone, satisfactory results are generally obtained at a separating efficiency of about 20–95%, preferably between 35 and 80% and an internal solids recycle rate of about 1/4 to 10 lbs. per pound of catalyst entering chamber 227 through grid 228. However, the system can be adapted for more or less efficient solids separation as desired. This can be accomplished by either manually or automatically raising or lowering the solids level 259 in hopper 230 by means of damper 251 which in turn affects the cyclone efficiency and hence the solids density in the gas stream passing up through discharge pipe 235. An additional means of controlling solids carry-over from chamber 277 is given by adjustable orifice 236 which may be set to by-pass as much as 50%, or more, of the suspension around the internal cyclone unit, although a by-pass of about 20% or less is usually sufficient.

Having described preferred embodiments of this invention, it should be understood that it embraces such other variations and modifications as come within the spirit and scope thereof. Only such limitations should be imposed on our invention as are indicated in the appended claims.

We claim:

1. A process for regenerating finally divided solid catalysts deactivated by deposits removable by the action of a regenerating gas in a regeneration zone, which comprises introducing deactivated catalyst into a relatively dense solids phase in the lower portion of the regeneration zone and passing regenerating gas up through said regeneration zone to maintain the catalyst in a dense phase, then passing the catalyst as a dilute suspension into a relatively dilute solids phase in the upper portion of said regeneration zone, passing the last-mentioned dilute suspension of catalyst at a relatively low gas velocity into a gas-solids separation zone within the regeneration zone and subjecting the dilute suspension of catalyst to an inefficient separation, whereby approximately from about 35 to 80 percent of the catalyst solids are separated, returning the separated catalyst as a relatively compact confined column within the regeneration zone to the relatively dense solids phase at the lower portion of the regeneration zone, bypassing a substantial portion of the suspension in the relatively dilute solids phase of the regeneration zone around the said gas solids separation zone and mixing the same with the gaseous suspension containing the unseparated solid catalyst from said gas solids separation zone, and withdrawing said mixture overhead at essentially the same rate deactivated catalyst is introduced into the relatively dense solids phase.

2. An apparatus for regenerating catalyst deactivated by deposits resulting from the catalytic conversion of hydrocarbons, comprising a vertically elongated treating chamber, a distribution plate in the bottom of said treating chamber, means for admitting a solids in gas suspension to a lower portion of said chamber below the distribution plate, a relatively low gas velocity separator arranged in an upper portion of said chamber for continuously separating from about 35 to 80 per cent of the catalyst solids from the suspension, means within said chamber for returning the separated solids from the separator to a lower portion of the chamber below the distribution plate and means for withdrawing a suspension of the unseparated solids in gas overhead through the separator at the same rate said solids are introduced into the treating chamber, said means for withdrawing the solids in gas suspension constituting the sole means for the withdrawal of solid particles from said treating chamber, and means associated with the withdrawal means for by-passing a predetermined amount of the suspension from the treating zone around the separator.

WALTER A. WURTH.
HOMER Z. MARTIN.
CHARLES E. JAHNIG.

REFERENCES CITED

The following references are of record in the file of this patent:

UNITED STATES PATENTS

| Number | Name | Date |
| --- | --- | --- |
| 1,862,179 | Dolley | June 7, 1932 |
| 2,336,017 | Jewell et al. | Dec. 7, 1943 |
| 2,373,008 | Becker | Apr. 3, 1945 |
| 2,377,935 | Gunness | June 12, 1945 |
| 2,381,119 | Dill | Aug. 7, 1945 |
| 2,383,636 | Wurth | Aug. 28, 1945 |
| 2,387,309 | Sweeney | Oct. 23, 1945 |
| 2,394,680 | Gerhold et al. | Feb. 12, 1946 |
| 2,415,755 | Ogorzaly et al. | Feb. 11, 1947 |
| 2,415,756 | Le Roi et al. | Feb. 11, 1947 |
| 2,416,729 | Arveson | Mar. 4, 1947 |
| 2,420,049 | Martin | May 6, 1947 |
| 2,420,558 | Munday | May 13, 1947 |
| 2,427,341 | Alther | Sept. 16, 1947 |
| 2,436,721 | Laughlin et al. | Feb. 24, 1948 |
| 2,439,811 | Jewell | Apr. 20, 1948 |
| 2,446,678 | Voorhees | Aug. 10, 1948 |
| 2,453,740 | Becker | Nov. 16, 1948 |